United States Patent
Gareau et al.

(10) Patent No.: US 11,184,112 B1
(45) Date of Patent: Nov. 23, 2021

(54) OPENFEC ERROR MARKING

(71) Applicant: Ciena Corporation, Hanover, MD (US)

(72) Inventors: Sebastien Gareau, Ottawa (CA); Jeffery Thomas Nichols, Marietta, GA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/147,596

(22) Filed: Jan. 13, 2021

Related U.S. Application Data

(60) Provisional application No. 63/113,829, filed on Nov. 14, 2020.

(51) Int. Cl.
 *H04L 1/00* (2006.01)
 *H04L 27/36* (2006.01)

(52) U.S. Cl.
 CPC .......... *H04L 1/0071* (2013.01); *H04L 1/0008* (2013.01); *H04L 1/0058* (2013.01); *H04L 27/362* (2013.01)

(58) Field of Classification Search
 None
 See application file for complete search history.

(56) References Cited

U.S. PATENT DOCUMENTS

| | | |
|---|---|---|
| 6,986,097 B1 | 1/2006 | Ireland et al. |
| 7,003,708 B1 | 2/2006 | Ireland et al. |
| 7,039,854 B1 | 5/2006 | Ireland et al. |
| 7,058,876 B1 | 6/2006 | Ireland et al. |
| 7,073,117 B1 | 7/2006 | Ireland et al. |
| 7,096,408 B1 | 8/2006 | Ireland et al. |
| 8,306,420 B2 | 11/2012 | Conklin et al. |
| 8,356,233 B2 | 1/2013 | Nichols et al. |
| 8,458,560 B2 | 6/2013 | Nichols |
| 8,718,471 B2 | 5/2014 | Prakash et al. |
| 8,732,358 B2 | 5/2014 | Nichols et al. |
| 8,830,993 B1 | 9/2014 | Dublin et al. |
| 8,867,913 B2 | 10/2014 | Gareau et al. |
| 9,264,139 B2 | 2/2016 | Young et al. |
| 9,825,883 B2 | 11/2017 | Nichols et al. |
| 9,980,021 B2 | 5/2018 | Oltman et al. |

(Continued)

FOREIGN PATENT DOCUMENTS

EP  2 983 314 A1  2/2016

OTHER PUBLICATIONS

Mike A. Sluyski, "Open ROADM MSA 3.01 W-Port Digital Specification (200G-400G)", Open ROADM—Draft document, Jun. 25, 2019, pp. 1-56.

(Continued)

*Primary Examiner* — Mujtaba M Chaudry
(74) *Attorney, Agent, or Firm* — Clements Bernard Baratta; Lawrence A. Baratta, Jr.; Christopher L. Bernard

(57) ABSTRACT

Systems and methods include receiving blocks of data that has been Forward Error Correction (FEC) encoded via Open Forward Error Correction (OFEC) adaptation; decoding the blocks of data; processing Cyclic Redundancy Check (CRC) data that is included in padding data required in the OFEC adaptation, wherein the padding data is distributed across N rows of payload data; and determining a location of any errors in the payload data based on the processed CRC data. The OFEC adaptation is for mapping the blocks of data into any of a FlexO-x frame structure, a ZR frame structure, and variants thereof, and the location of any errors can be used for error marking.

20 Claims, 5 Drawing Sheets

(56) References Cited

U.S. PATENT DOCUMENTS

| | | |
|---|---|---|
| 10,063,336 B1 | 8/2018 | Moynihan et al. |
| 10,135,760 B2 | 11/2018 | Gareau |
| 10,193,688 B2 | 1/2019 | Gareau et al. |
| 10,218,823 B2 | 2/2019 | Gareau |
| 10,225,037 B2 | 3/2019 | Gareau |
| 10,256,909 B2 | 4/2019 | Gareau et al. |
| 10,313,103 B1 | 6/2019 | Perras et al. |
| 10,382,167 B2 | 8/2019 | Gareau et al. |
| 10,396,972 B1 | 8/2019 | Gareau et al. |
| 10,397,088 B2 | 8/2019 | Gareau |
| 10,425,177 B2 | 9/2019 | Gareau et al. |
| 10,498,476 B2 | 12/2019 | Gareau et al. |
| 10,567,352 B2 | 2/2020 | Gareau et al. |
| 10,594,395 B2 | 3/2020 | Abdullah et al. |
| 10,673,782 B2 | 6/2020 | Gareau et al. |
| 10,750,260 B1 | 8/2020 | Gareau |
| 10,826,600 B2 | 11/2020 | Ibach et al. |
| 10,868,662 B2 | 12/2020 | Gareau et al. |
| 2005/0204255 A1* | 9/2005 | Yeh .................. H03M 13/2975 714/755 |
| 2008/0250298 A1* | 10/2008 | Stockhammer ....... H04L 1/0078 714/762 |
| 2010/0031121 A1* | 2/2010 | Ottavj .................. H04L 1/0041 714/762 |
| 2010/0287593 A1* | 11/2010 | Sayadi .................. H04L 1/0083 725/62 |
| 2011/0131614 A1* | 6/2011 | Sayadi .................. H04H 20/42 725/62 |
| 2012/0324317 A1* | 12/2012 | Sripathi ................ H04L 1/0054 714/795 |
| 2020/0177361 A1 | 6/2020 | Gareau et al. |
| 2020/0358722 A1 | 11/2020 | Gareau et al. |
| 2020/0396050 A1 | 12/2020 | Perras et al. |

OTHER PUBLICATIONS

Atul Srivastava et al. "Open ZR+ MSA", Technical Specification, Version 1.0, Sep. 4, 2020, pp. 1-74.

Telecommunication Standardization Sector of ITU, ITU-T G.709. 3/Y.1331.3, "Flexible OTN long-reach Interfaces", Jun. 2018, pp. 1-34.

* cited by examiner

OPENFEC ERROR MARKING

CROSS-REFERENCE TO RELATED APPLICATION(S)

The present disclosure claims priority to U.S. Provisional Patent Application No. 63/113,829, filed Nov. 14, 2020, and entitled "OpenFEC error marking," the contents of which are incorporated by reference in their entirety.

FIELD OF THE DISCLOSURE

The present disclosure generally relates to Forward Error Correction (FEC). More particularly, the present disclosure relates to systems and methods for OpenFEC error marking.

BACKGROUND OF THE DISCLOSURE

Ethernet interfaces have a Mean Time to False Packet Acceptance (MTTFPA) requirement of End of Life (EOL). Also, new Ethernet interfaces operate at a higher Bit Error Rate (BER) and make use of Forward Error Correction (FEC) decoding capabilities to mark appropriate datapath errors to guarantee and meet MTTFPA requirements. This is a known practice for Ethernet interfaces, and these interfaces (until now) have been using Hard Decision (HD) FEC decoders, so the approach is fairly straightforward. That is, HD FEC easily identifies error locations, simplifying error marking.

New Ethernet coherent interfaces use Soft Decision (SD) FEC decoders, and marking specific uncorrected errors is complicated and problematic. Currently, the only standard coherent Ethernet interface is 400ZR driven by the OIF. It uses a concatenated FEC (CFEC) approach, which provides moderate performance FEC. Error marking has been addressed with 400ZR. There is another coherent Ethernet interface referred to as OpenZR+ (available at www.openzrplus.org) and described in the OpenZR+ Specifications, v. 1.0, 4 Sep. 2020; the contents are incorporated by reference. OpenFEC is described in the Open ROADM MSA 3.01 W-Port Digital Specification (200G-400G) (available at www.openroadm.org), Jun. 25, 2019; the contents are incorporated by reference, and it is referred to herein as the Open ROADM Specification. OpenZR+ utilizes OpenFEC (OFEC) for higher performance applications. The mappings utilize the Ethernet 257b Physical Coding Sublayer (PCS) encodings. Of note, there are no published schemes on OpenZR+ interfaces to meet MTTFPA requirements, i.e., to support error marking.

BRIEF SUMMARY OF THE DISCLOSURE

The present disclosure relates to systems and methods for OpenFEC error marking. That is, the present disclosure enables error marking for OFEC that is used in ZR+, FlexO, etc. The present disclosure can be implemented in a coherent Digital Signal Processor (DSP), Application Specific Integrated Circuit (ASIC), etc. The present disclosure provides a process for error marking to meet MTTFPA requirements for ZR+ and FlexO interfaces. It also can apply to any OFEC applications, such as described in the Open ROADM MSA 3.01. Further, this approach can be extended to any FEC scheme that utilizes padding data where the padding data is then spread out with CRC data included therein for error marking.

In various embodiments, the present disclosure can include a circuit that implements steps and a method that includes steps. The steps include receiving blocks of data that has been Forward Error Correction (FEC) encoded via Open Forward Error Correction (OFEC) adaptation; decoding the blocks of data; processing Cyclic Redundancy Check (CRC) data that is included in padding data required in the OFEC adaptation, wherein the padding data is distributed across N rows of payload data; and determining a location of any errors in the payload data based on the processed CRC data. At the other end, prior to the receiving, the steps can include performing the OFEC adaptation and distributing the CRC data across the FlexO/ZR frame N rows with the padding data.

The steps can further include marking Ethernet frames with an error code based on the detected FEC error location. The steps can further include utilizing the CRC data to assist in FEC convergence.

The padding data can include M bits that are spread across the N FlexO/ZR frame rows thereby having M/N padding bits for each distributed location, and wherein the M/N padding bits include X CRC bits and Y pad bits. For example, for FlexO-4, M=992, for FlexO-3, M=744, and for FlexO-2, M=496.

The N rows can include any of 29 rows, 14.5 rows, and 7.25 rows. For 14.5 rows and 7.25 rows, this means the distributed padding data is included in the middle of a row (for 14.5 rows) and at a quarter of the row (for 7.25 rows). The CRC data can be utilized in an interleaved manner, such as illustrated in FIG. 4.

The OFEC adaptation can be for mapping the blocks of data into any of a FlexO frame structure, a ZR frame structure, and variants thereof. The OFEC adaptation can include a plurality of modes includes a 16-Quadrature Amplitude Modulation (16-QAM) mode, an 8-QAM mode, and a Quadrature Phase Shift Keying (QPSK) mode using 116, 87, and 58 rows, respectively, in the payload data. Of course, this can include additional modes such as 32-QAM, 64-QAM, etc. The padding data can be distributed across 29 rows for each of the plurality of modes.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 illustrates conventional OFEC adaptation with padding at the end. FIG. 3 illustrates the modified OFEC adaptation, where the padding is distributed 29 rows. FIG. 4 illustrates the modified OFEC adaptation, where the padding is distributed 29 rows in an interleaved manner.

DETAILED DESCRIPTION OF THE DISCLOSURE

Figure 1:
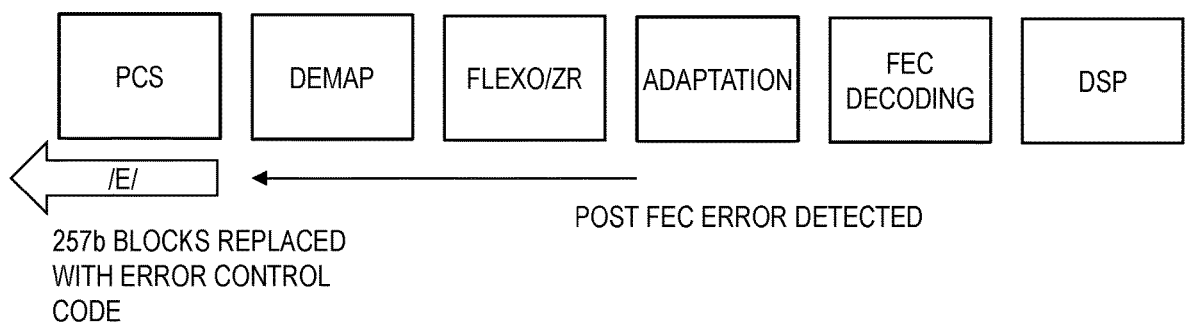
FIG. 1 is a block diagram of the functional flow of modified OFEC adaptation for error marking.

In various embodiments, the present disclosure relates to systems and methods for OpenFEC error marking. That is, the present disclosure enables error marking for OFEC that is used in ZR+, FlexO, etc. The present disclosure can be implemented in a coherent Digital Signal Processor (DSP), Application Specific Integrated Circuit (ASIC), etc. The present disclosure provides a process for error marking to meet MTTFPA requirements for ZR+ and FlexO interfaces.

It also can apply to any OFEC applications, such as described in the Open ROADM MSA 3.01. Further, this approach can be extended to any FEC scheme that utilizes padding data where the padding data is then spread out with CRC data included therein for error marking.

OFEC includes a block-code-based encoder and iterative soft-decision-based decoder, such as with an overhead of 15.3% and a Net Coding Gain (NCG) of 11.1 dB for Quadrature Phase Shift Keying (QSPK) and 11.6 dB for 16-Quadrature Amplitude Modulation (16QAM) after three soft-decision iterations, with pre-FEC BER threshold of $-2.0 \times 10^{-2}$.

Generally, the present disclosure includes taking padding bits that are associated with OFEC adaptation and distributing them across the payload and incorporating Cyclic Redundancy Check (CRC) data for integrity. That is, the present disclosure modifies the current standard documented OFEC adaptation procedures to provide support for error marking. The distributed Cyclic Redundancy Check (CRC) data is used to detect error locations during decoding process. Further, the distributed padding bits are not simply dummy data but CRC data. Having the padding bits distributed reduces buffering and latency for computing CRC since the block size is reduced. Further, the distributed padding enables more specific error marking, so only packets in-between CRC checks are required to be marked as errored, reducing error amplification. For example, a single CRC at the end in the OFEC adaptation could be used to detect and mark, but this would require marking all packets in the datapath, i.e., it is not localized. The distributed padding approach enables greater localization of error marking.

Thus, this disclosure presents a process of tweaking/modifying OFEC adaptation in a way to accommodate the insertion of CRC (checksums) for the purpose of error marking. The CRCs are checked in the FEC adaptation function (post-FEC decoding). It conveniently could also be used for FEC convergence and improve the FEC decoders. The process of FEC convergence is a check in a decoder that verifies the integrity of the data, and if errors are detected, the FEC decoder can continue with additional iterations. The process can be used for ZR+ interfaces as well as FlexO-xe (e.g., underclocked Ethernet optimized) interfaces that make use of OFEC for higher performance applications and direct Ethernet mapping.

The process may not be backward compatible with existing, standardized OFEC interfaces, but can be implemented for future 400G, 600G and 800G OFEC interfaces (e.g., 800ZR+ and FlexO-8e-DO). Also, the process may be used with existing OFEC interfaces in a proprietary implementation.

FIG. 1 is a block diagram of the functional flow of modified OFEC adaptation for error marking. Data is shown flowing from left-to-right, starting at a Digital Signal Processor (DSP), then FEC decoding, then adaptation, then FlexO/ZR, demapping, and Ethernet PCS coding. The modified OFEC adaptation detects a post-FEC error (CRC) and marks the data as bad. Then the Ethernet PCS will replace such bad data with /E/ error control blocks. This guarantees that any malformed packets (also matching packet CRC) will not be falsely accepted.

FlexO and ZR+ signals mapped to 16QAM (Quadrature Amplitude Modulation), 8QAM, and QPSK (Quadrature Phase Shift Keying) modes are using 116, 87 and 58 rows, respectively, when mapping FlexO/ZR (payload) data into the OFEC adaptation. The common divisor is 29 (29x2, 29x3, 29x4). In an embodiment, the scheme in this disclosure distributes the OFEC adaptation padding across 29 FlexO/ZR frame rows evenly. This differs from the original OFEC adaptation procedures.

Figure 2:
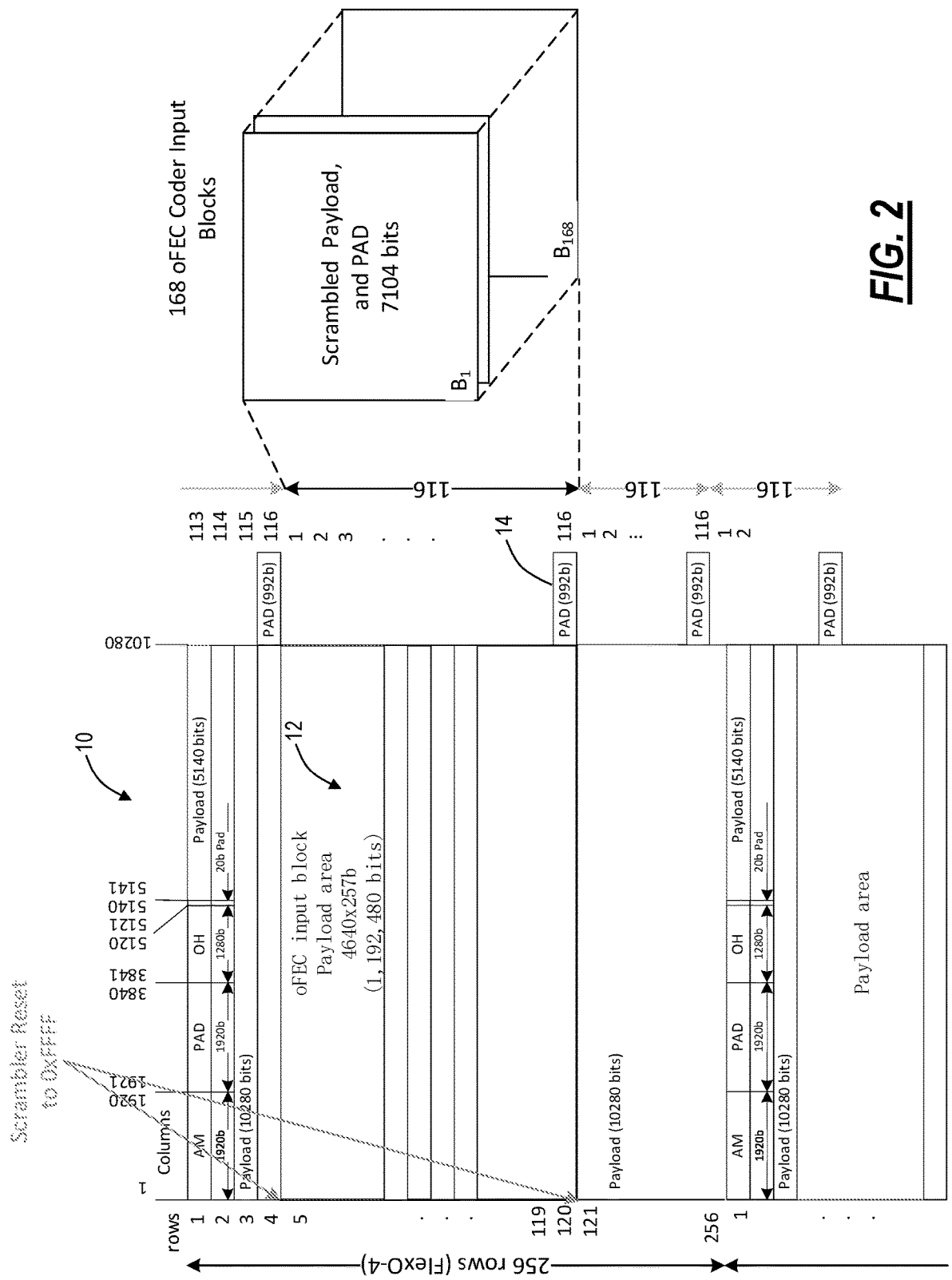
FIGS. 2-4 are block diagrams of FlexO-4 interfaces for describing OFEC adaptation. Specifically.
Figure 3:
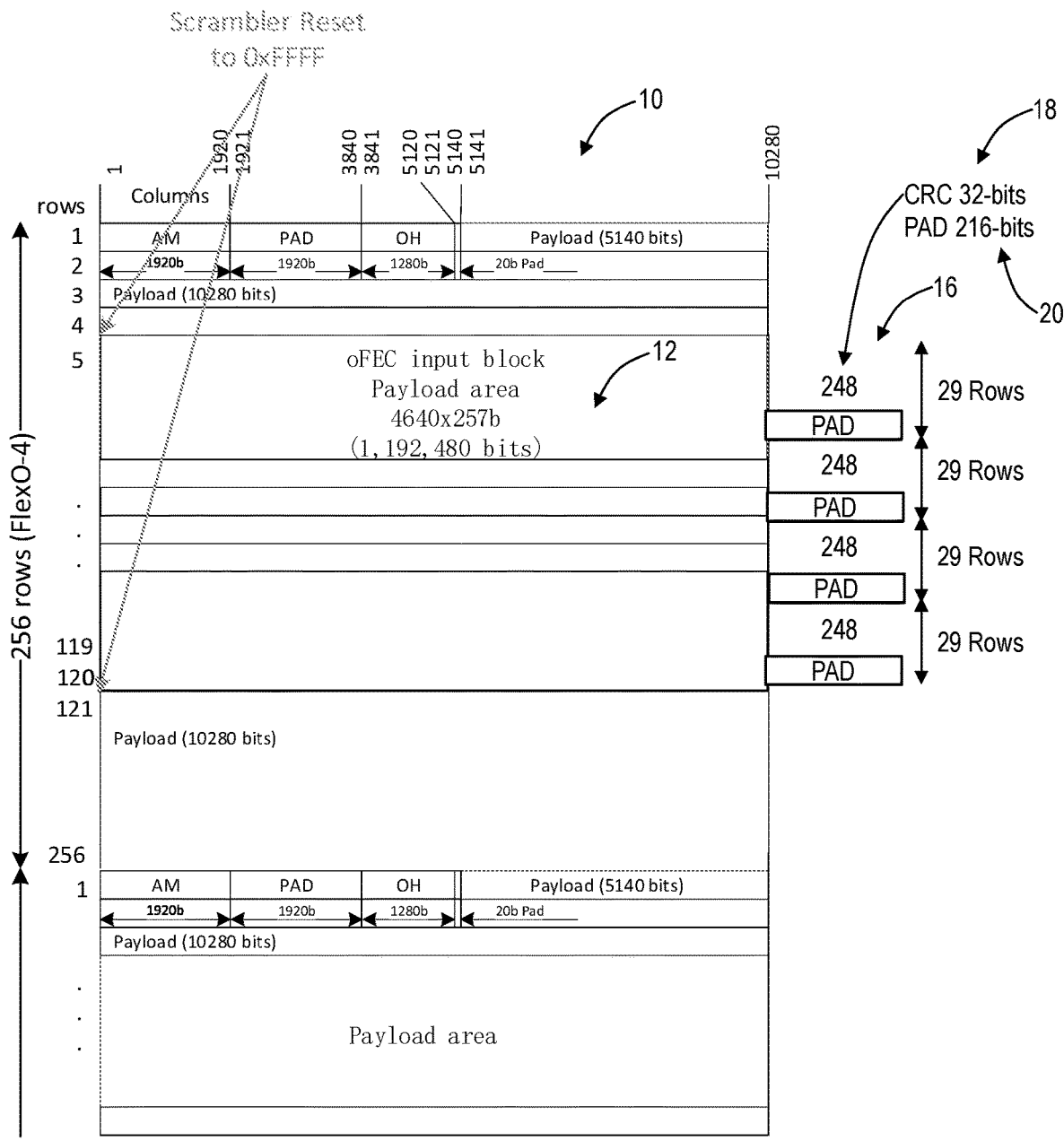
Figure 4:
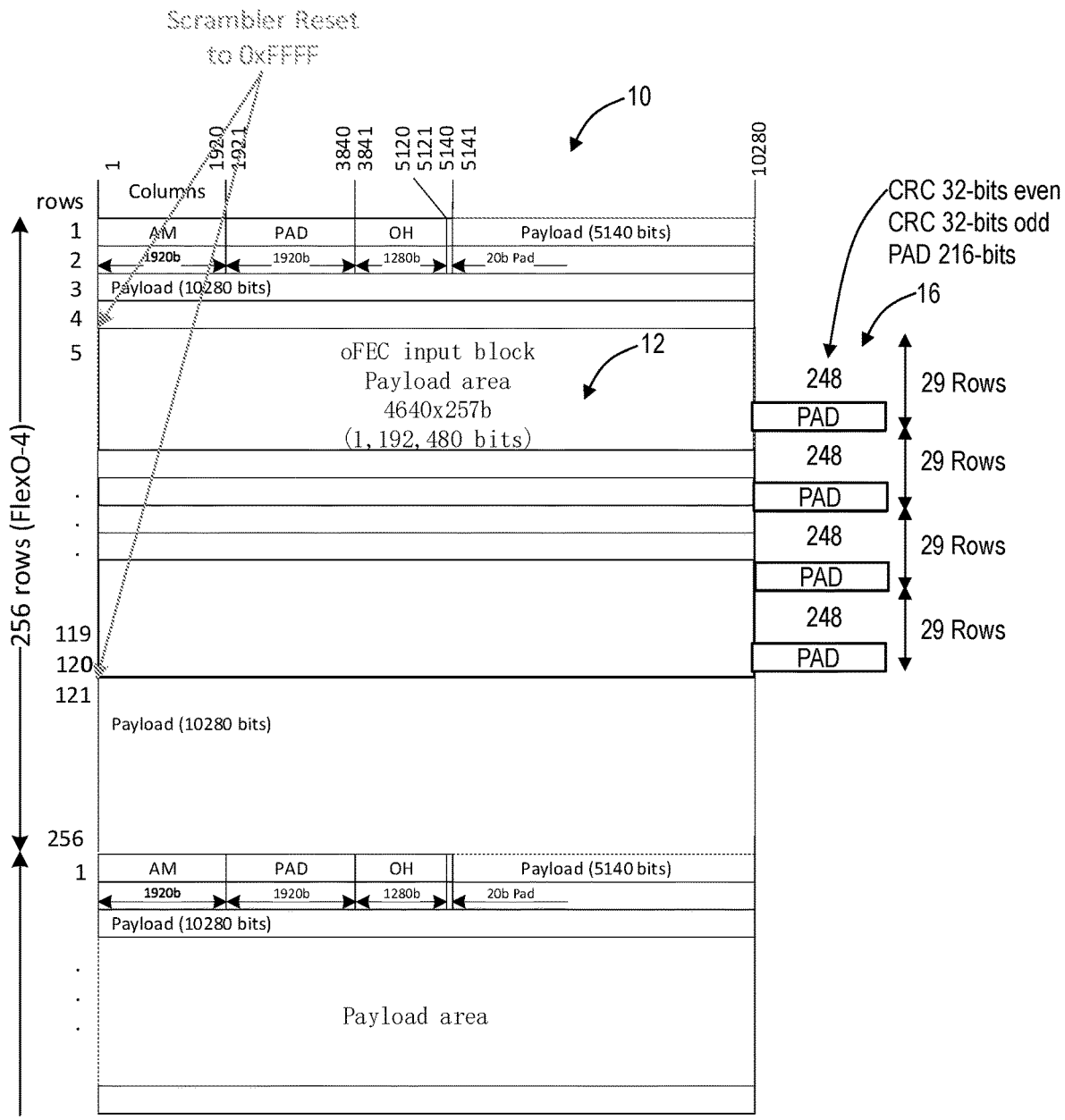

FIGS. 2-4 are block diagrams of FlexO-4 interfaces for describing OFEC adaptation. Specifically, FIG. 2 illustrates conventional OFEC adaptation with padding at the end. Specifically, the conventional OFEC adaptation is from FIG. 14 of the OpenROADM Specification. FIG. 3 illustrates the modified OFEC adaptation, where the padding is distributed every 29 rows. FIG. 4 illustrates the modified OFEC adaptation, where the padding is distributed every 29 rows in an interleaved manner. FIGS. 2-4 are diagrams of a frame 10 prior to OFEC adaptation.

Those skilled in the art will recognize the frame 10 for the FlexO-4 interfaces in FIGS. 3-4 are presented for illustration purposes, and the modified OFEC adaptation is applicable to other interfaces, such as 100G, 200G, and 300G (and beyond such as 800G) interfaces as well. For example, in an embodiment, this proposed scheme could keep the ratios of 248 padding bits per 29 columns consistent across all data rates. That is, the present disclosure can apply to other framing schemes including FlexO-2, FlexO-3, etc. as well as future schemes, e.g., FlexO-5, FlexO-6, etc.

For example, Table 2 in the OpenROADM Specification illustrates the OFEC adaptation rates as follows:

| | FlexO-x Rows | PAD (bits) | oFEC-x coder payload (bits) | oFEC Blocks | FlexO-x-oFEC (bits) | Modulation Format |
|---|---|---|---|---|---|---|
| FlexO-4-oFEC | 116 rows, (4640 × 257 bits) | 992 | 1,193,472 | 168 | 1,376,256 | DP-16QAM |
| FlexO-3-oFEC | 87 rows, (3480 × 257 bits) | 744 | 895,104 | 126 | 1,032,192 | DP-8QAM |
| FlexO-2-oFEC | 58 rows, (2320 × 257 bits) | 496 | 596,736 | 84 | 688,128 | DP-QPSK |

Of note, there are enough PAD bits 14 to use CRC and to distribute the PAD bits 14 with CRC included therein for error marking in the payload area 12. The following descriptions describe this approach with reference to FlexO-4, but those skilled in the art will recognize this is only for illustration purposes.

Again, FIGS. 2-4 are the FlexO-4 FlexO frame structure from the OpenROADM Specification. In each of FIGS. 2-4, there is an OFEC input block with the payload area 12 (1,192,480 bits for FlexO-4). This data is processed in the OFEC adaptation, such as described in the OpenROADM Specification. Note, other sections are also adapted with OFEC, but there is no need to modify the padding in the non-payload area since the present disclosure is concerned with error marking in the payload area 12. In FIG. 2, the conventional OFEC adaptation includes adding 992 PAD bits 14 for padding at the end of the payload area 12 for the FlexO-4.

The PAD bits 14 are for aligning and synchronizing the FlexO/ZR frame 10 to an OFEC structure (e.g., see Section 11.1 in the Open ROADM Specification). The PAD bits 12 are appended to the Flex-O data to enable this alignment. Alignment is not necessarily associated with row boundaries as conveniently drawn. The PAD bits 12 are removed after the decoder on the receive interface. In a conventional embodiment, the PAD bits 12 are an all-zero field that gets scrambled prior to encoding and removed after decoding and descrambling.

That is, the OFEC adaptation uses some padding to make it work with FlexO/ZR multiples. But there is no ability for any error marking in current standards. Placing the CRC there as is defined today, as in FIG. 2, the CRC would cover a large number of bits and require memory to store and delay the data so it can be marked (this can be cumbersome and adds latency and keeping link latency low is critical in many applications). Of note, while it looks like the PAD bits 14 are distributed in FIG. 2, only a single set of PAD bits 14 are used for all of the payload area 12. This does not provide fine enough granularity for error marking. At best, it could determine an error is in the payload area 12, but this would require marking all data as errored.

The present disclosure distributes the padding across rows in the payload area 12, making the CRC cover a smaller number of bits, requiring less memory and less latency, making it suitable for an error marking scheme. That is, instead of one set of PAD bits 14 for the entire payload area 12, the present disclosure distributes this across different rows—resulting in the same amount of PAD bits, but distributed.

In FIG. 3, the modified OFEC adaptation distributes these 992 PAD bits 12 as distributed PAD bits 16 into four sections of 248 bits, every 29 rows. Thus, the amount of padding is the same but distributed as the distributed PAD bits 16. Also, the 248 bits can include 32-bits of CRC data and 216-bits of padding data. Thus, the 32-bits of CRC data every 29 rows can be used to localize and mark errors. That is, the present disclosure does not use all-zeros for the PAD bits, but rather some CRC bits 18 and some PAD bits 20, e.g., 32-bits for the CRC bits 18 and 216-bits for the PAD bits 20. Note, CRC32 is just presented as an example, other values can be used. Also, other error checking schemes are also contemplated instead of CRC.

In FIGS. 3-4, it is convenient to draw 29 rows, but the process could also alternatively use 14.5 or 7.25 rows to reduce the block size and error amplification introduced with error marking (there are enough padding bits). Again, error amplification means having a lot of Ethernet frames marked as errored, triggered by a small number of post-FEC errors. With distributed padding and CRC, it is possible to mark significantly fewer frames. A CRC (e.g 32-bit CRCs are common but other values can be considered) is inserted in the padding bits and protects 296960 bits (post-FEC) for marking purposes.

In FIG. 4, an alternative approach could be to map two interleaved (even/odd) CRC32 per padding opportunity. The CRCs would protect their respective even/odd payload bits. OFEC is described as using two parallel decoders, again using even/odd bit interleaving. In this alternative approach, the two CRCs can feedback back to the two parallel decoders to assist in FEC convergence functions. As described herein, FEC convergence relates to iterations in SD FEC. With knowledge there are no errors, based on the CRC, the convergence can be improved and iterations reduced (resulting in a lower power FEC).

Figure 5:
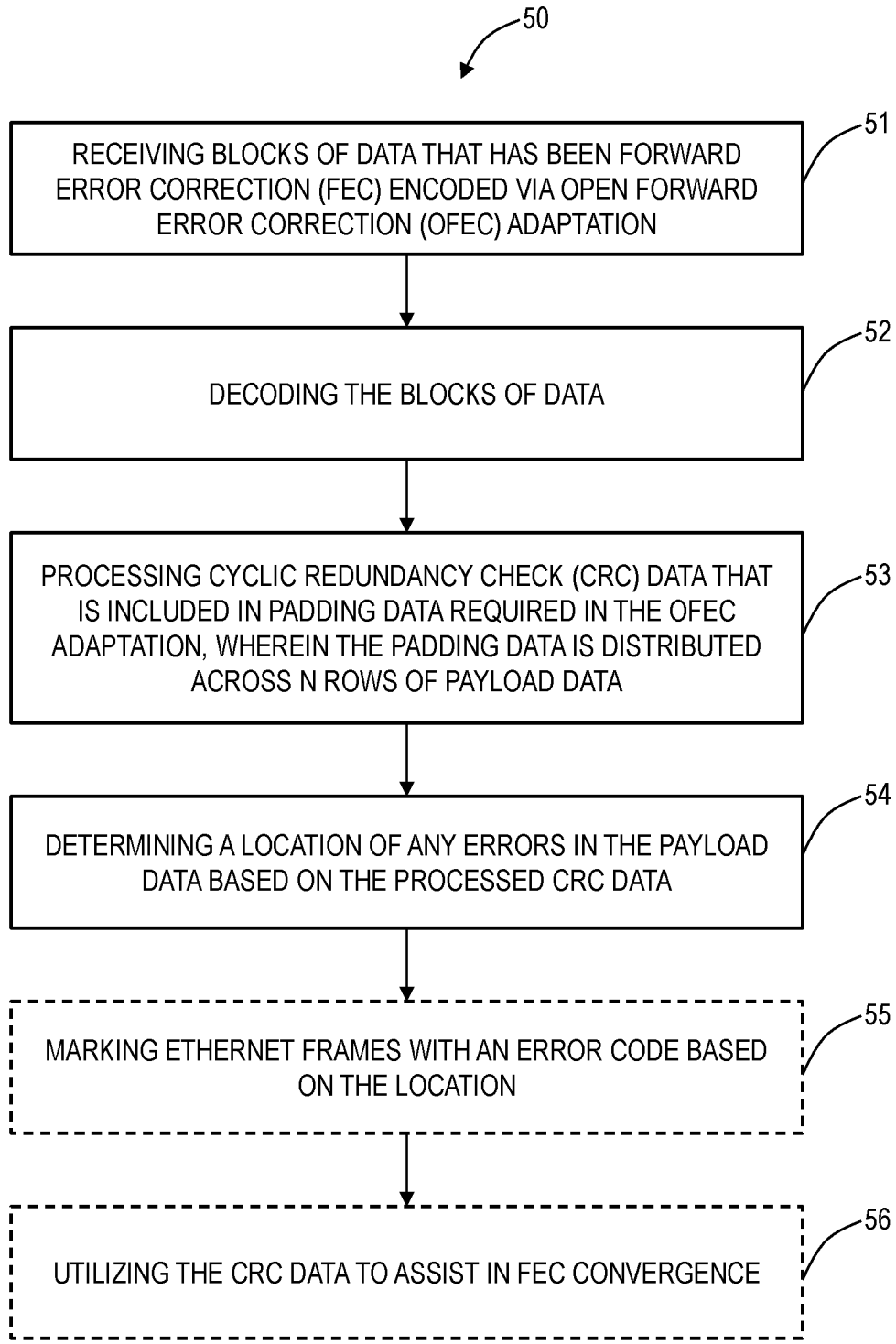
FIG. 5 is a flowchart of a process for error marking using modified OFEC adaptation.

FIG. 5 is a flowchart of a process 50 for error marking using modified OFEC adaptation. The modified OFEC adaptation process contemplates implementation in a circuit, electrical circuitry, e.g., a DSP, FPGA, ASIC, etc. The process 50 is described with reference to a receiver that receives transmitted data and is performing FEC decoding. The modified OFEC adaptation allows error marking in the process 50.

The process 50 includes receiving blocks of data that has been Forward Error Correction (FEC) encoded via Open Forward Error Correction (OFEC) adaptation (step 51); decoding the blocks of data (step 52); processing Cyclic Redundancy Check (CRC) data that is included in padding data required in the OFEC adaptation, wherein the padding data is distributed across N rows of payload data (step 53); and determining a location of any errors in the payload data based on the processed CRC data (step 54).

At the other end, prior to the receiving, the process 50 can include performing the OFEC adaptation and distributing the CRC data across the N rows with the padding data.

The process 50 can further include marking Ethernet frames with an error code based on the location (step 55). The process 50 can further include utilizing the CRC data to assist in FEC convergence (step 56). Typical SD FEC schemes are based on iterative processes to correct errors. When payload data is clean and errors are no longer present, further iterations are not needed and dissipate power unnecessarily. A CRC can be used to check the integrity of the payload and stop the further iterations, which means the FEC has converged. The CRC proposed herein can be used for such purpose as well as error marking.

The padding data can include M bits that are spread across the N FlexO/ZR frame rows thereby having M/N padding bits for each distributed location, and wherein the M/N padding bits include X CRC bits and Y pad bits. For example, for FlexO-4, M=992, for FlexO-3, M=744, and for FlexO-2, M=496.

The N rows can include any of 29 rows, 14.5 rows, and 7.25 rows. For 14.5 rows and 7.25 rows, this means the distributed padding data is included in the middle of a row (for 14.5 rows) and at a quarter of the row (for 7.25 rows). The CRC data can be utilized in an interleaved manner, such as illustrated in FIG. 4. Here, there are two CRC codes—one covering even bits and the other odd bits in an interleaved manner. The two CRCs can be placed in the padding. Since OFEC uses two decoders, again in an even/odd bit interleaved scheme, the interleaved CRCs can be used for FEC convergence, as described above.

The OFEC adaptation can be for mapping the blocks of data into any of a FlexO frame structure, a ZR frame structure, and variants thereof. The OFEC adaptation can include a plurality of modes includes a 16-Quadrature Amplitude Modulation (16-QAM) mode, an 8-QAM mode, and a Quadrature Phase Shift Keying (QPSK) mode using 116, 87, and 58 rows, respectively, in the payload data. The padding data can be distributed across 29 rows for each of the plurality of modes.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like;

Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A circuit configured to:
   receive blocks of data that has been Forward Error Correction (FEC) encoded via Open Forward Error Correction (OFEC) adaptation,
   decode the blocks of data,
   process Cyclic Redundancy Check (CRC) data that is included in padding data required in the OFEC adaptation, wherein the padding data is distributed across N rows of payload data, and
   determine a location of any errors in the payload data based on the processed CRC data.

2. The circuit of claim 1, wherein a second circuit is configured to perform the OFEC adaptation and distribute the CRC data across the N rows with the padding data, prior to the blocks being received.

3. The circuit of claim 1, wherein the circuit is further configured to mark Ethernet frames with an error code based on the post-FEC error location.

4. The circuit of claim 1, wherein the circuit is further configured to utilize the CRC data to assist in FEC convergence.

5. The circuit of claim 1, wherein the padding data includes M bits that are spread across the N rows thereby having M/N padding bits for each distributed location, and wherein the M/N padding bits include X CRC bits and Y pad bits.

6. The circuit of claim 1, wherein the N rows include any of 29 rows, 14.5 rows, and 7.25 rows.

7. The circuit of claim 1, wherein the CRC data is utilized in an interleaved manner.

8. The circuit of claim 1, wherein the OFEC adaptation is for mapping the blocks of data into any of a FlexO frame structure, a ZR frame structure, and variants thereof.

9. The circuit of claim 1, wherein the OFEC adaptation includes a plurality of modes including a 16-Quadrature Amplitude Modulation (16-QAM) mode, an 8-QAM mode, and a Quadrature Phase Shift Keying (QPSK) mode using 116, 87, and 58 rows, respectively, in the payload data.

10. The circuit of claim 9, wherein the padding data is distributed across 29 rows for each of the plurality of modes.

11. A method comprising
    receiving blocks of data that has been Forward Error Correction (FEC) encoded via Open Forward Error Correction (OFEC) adaptation;
    decoding the blocks of data;
    processing Cyclic Redundancy Check (CRC) data that is included in padding data required in the OFEC adaptation, wherein the padding data is distributed across N rows of payload data; and
    determining a location of any errors in the payload data based on the processed CRC data.

12. The method of claim 11, further comprising
    performing the OFEC adaptation and distributing the CRC data across the N rows with the padding data, prior to the receiving.

13. The method of claim 11, further comprising
    marking Ethernet frames with an error code based on the post-FEC error location.

14. The method of claim 11, further comprising
    utilizing the CRC data to assist in FEC convergence.

15. The method of claim 11, wherein the padding data includes M bits that are spread across the N rows thereby having M/N padding bits for each distributed location, and wherein the M/N padding bits include X CRC bits and Y pad bits.

16. The method of claim 11, wherein the N rows include any of 29 rows, 14.5 rows, and 7.25 rows.

17. The method of claim 11, wherein the CRC data is utilized in an interleaved manner.

18. The method of claim 11, wherein the OFEC adaptation is for mapping the blocks of data into any of a FlexO-x frame structure, a ZR frame, and variants thereof.

19. The method of claim 11, wherein the OFEC adaptation includes a plurality of modes including a 16-Quadrature Amplitude Modulation (16-QAM) mode, an 8-QAM mode, and a Quadrature Phase Shift Keying (QPSK) mode using 116, 87, and 58 rows, respectively, in the payload data.

20. The method of claim 19, wherein the padding data is distributed across 29 rows for each of the plurality of modes.

* * * * *